(12) United States Patent
Viano

(10) Patent No.: US 11,427,113 B1
(45) Date of Patent: Aug. 30, 2022

(54) WRAP-AROUND SHIELD

(71) Applicant: INSTITUTE FOR INJURY RESEARCH, Bloomfield Hills, MI (US)

(72) Inventor: David C. Viano, Bloomfield Hills, MI (US)

(73) Assignee: INSTITUTE FOR INJURY RESEARCH, Bloomfield Hills, MI (US)

( * ) Notice: Subject to any disclaimer, the term of this patent is extended or adjusted under 35 U.S.C. 154(b) by 9 days.

(21) Appl. No.: 17/236,454

(22) Filed: Apr. 21, 2021

(51) Int. Cl.
*B60N 2/28* (2006.01)
*B60N 2/90* (2018.01)
*B60R 11/00* (2006.01)

(52) U.S. Cl.
CPC ......... *B60N 2/2839* (2013.01); *B60N 2/2884* (2013.01); *B60N 2002/905* (2018.02); *B60R 2011/0015* (2013.01); *B60R 2011/0017* (2013.01); *B60R 2011/0059* (2013.01); *B60R 2011/0064* (2013.01)

(58) Field of Classification Search
None
See application file for complete search history.

(56) References Cited

U.S. PATENT DOCUMENTS

| | | | | |
|---|---|---|---|---|
| 2,888,061 A * | 5/1959 | Berlin | ............ | B60N 2/283 297/331 |
| 3,146,026 A * | 8/1964 | Berlin | ............ | A47D 1/103 297/487 |
| 3,865,433 A * | 2/1975 | Stafford | ............ | B60N 2/286 297/488 |
| 5,188,421 A * | 2/1993 | Arseneault | ............ | B60N 2/6036 297/188.2 |
| 5,468,047 A * | 11/1995 | Goor | ............ | B60N 2/2821 297/216.12 |
| 5,507,558 A * | 4/1996 | Kain | ............ | B60N 2/2839 297/250.1 |
| 5,749,599 A * | 5/1998 | Gardner | ............ | B60R 21/16 280/751 |
| 5,878,672 A * | 3/1999 | Ostermann | ............ | B60N 3/004 297/188.06 |
| 6,182,931 B1 * | 2/2001 | Richard | ............ | B60N 2/6009 248/102 |
| 6,216,927 B1 * | 4/2001 | Meritt | ............ | B60R 11/0235 296/37.16 |

(Continued)

FOREIGN PATENT DOCUMENTS

JP 2003002103 A * 1/2003 ............ B60N 3/023

*Primary Examiner* — David E Allred
(74) *Attorney, Agent, or Firm* — Cantor Colburn LLP

(57) ABSTRACT

Aspects of the disclosure include a frame that has an arc-shaped structure configured to create a space between the wrap-around shield and a child safety seat arranged inward from the frame. A first end of the frame is configured to curve toward a second end of the frame. The second end of the frame is also configured to curve toward the first end of the frame, and the first end and the second end having a respective profile that has a height which increases as the first end and the second end curve toward each other. A first connecting member connected to the first end of the frame, the first connecting member comprising a tether for connecting to a first latch of a rear seat.

13 Claims, 7 Drawing Sheets

(56) References Cited

U.S. PATENT DOCUMENTS

| | | | | |
|---|---|---|---|---|
| 6,315,180 B1* | 11/2001 | Watkins | ................... | B60R 11/04 |
| | | | | 396/419 |
| 7,207,469 B2* | 4/2007 | Hussaini | ............. | B60R 11/0235 |
| | | | | 224/585 |
| 7,658,153 B1* | 2/2010 | Patoka | .................... | B60R 11/00 |
| | | | | 108/46 |
| 7,887,140 B1* | 2/2011 | Forlivio | ................. | B60N 2/286 |
| | | | | 297/238 |
| 8,348,337 B2* | 1/2013 | Franck | ................. | B60N 2/2809 |
| | | | | 297/216.19 |
| 10,800,307 B1* | 10/2020 | Zhou | ........................ | B60N 2/99 |
| 2015/0375642 A1* | 12/2015 | Rajasingham | ....... | B60N 2/2848 |
| | | | | 280/38 |
| 2017/0328623 A1* | 11/2017 | Legare | ...................... | F25D 3/06 |
| 2018/0022250 A1* | 1/2018 | Lev | ........................ | B60N 2/838 |
| | | | | 297/399 |
| 2018/0251051 A1* | 9/2018 | Anderson | ............ | B60N 2/2821 |
| 2020/0269732 A1* | 8/2020 | Bendjellal | ............ | B60N 2/2821 |
| 2021/0061177 A1* | 3/2021 | Hatfield | ................. | B60R 7/043 |

\* cited by examiner

WRAP-AROUND SHIELD

BACKGROUND

Exemplary embodiments of the disclosure generally relate to occupant protection systems for a vehicle, and more specifically, to a wrap-around shield for a rear-seated passenger in a vehicle.

Child safety seats are designed to protect children from injury or death during a vehicle collision. A child safety seat has padding and a sturdy frame to protect a child from the impacts of a vehicle collision. While existing child safety seats have improved safety for children involved in vehicle collisions, improvements to further protect children would be welcomed in the industry.

SUMMARY

Disclosed is a wrap-around shield that includes a frame that has an arc-shaped structure configured to create a space between the wrap-around shield and a child safety seat arranged inward from the frame. A first end of the frame is configured to curve toward a second end of the frame. The second end of the frame is also configured to curve toward the first end of the frame, and the first end and the second end having a respective profile that has a height which increases as the first end and the second end curve toward each other. A first connecting member connected to the first end of the frame, the first connecting member comprising a tether for connecting to a first latch of a rear seat.

Also disclosed a method for arranging a wrap-around shield around a child safety seat, the method including arranging a frame around a child safety seat, such that a first end of the frame is proximate to a seatback of the child safety seat, a first side member of the frame is proximate to a first armrest of the child safety seat, and a second side member of the wrap-around shield is proximate to a second armrest of the child safety seat. The method further includes connecting the frame to a first lower anchor of a rear seat via a first connecting member connected to the first end.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
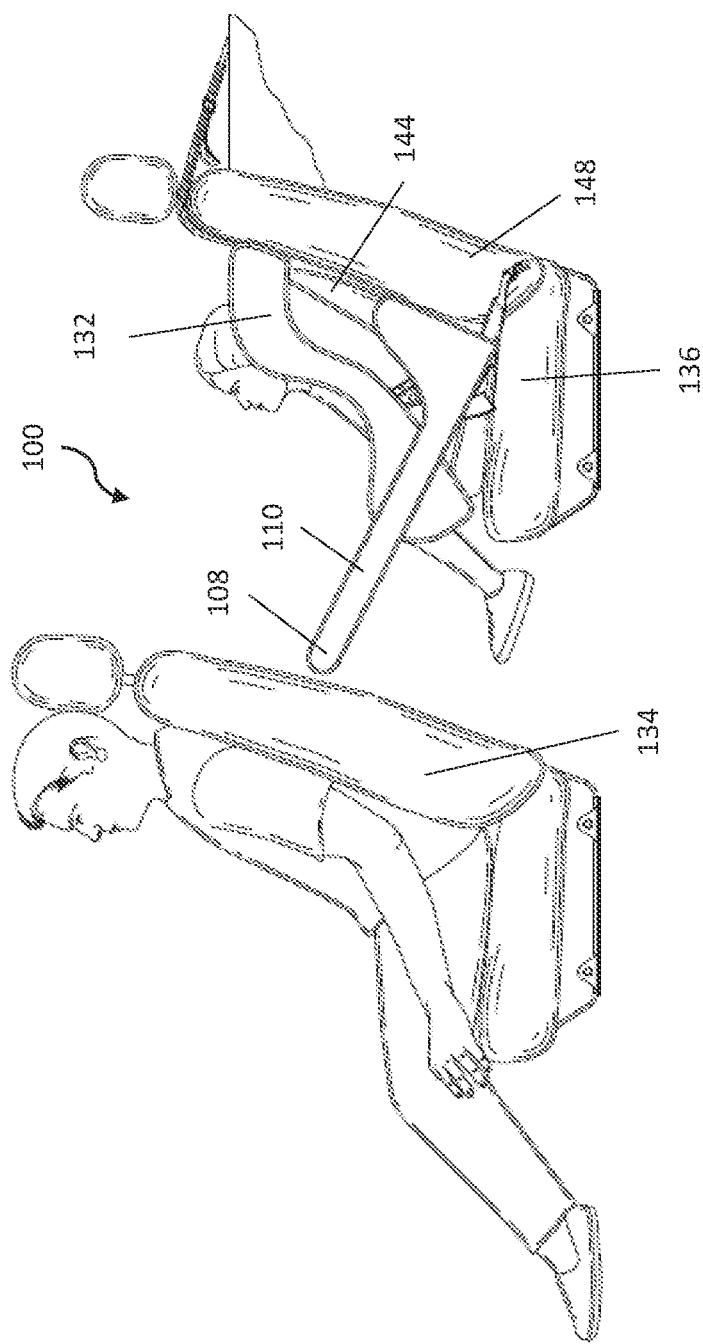
FIG. 1 illustrates a side-view of a wrap-around shield in accordance with embodiments of the present disclosure.

Managing Risk Sensibly: In the 1980s, the federal government based policies on managing health risks sensibly (Morrall 1983). The National Highway Traffic and Safety Administration (NHTSA) developed HARM as a metric to manage crash injury risks and prioritize safety improvements in vehicles (Malliaris et al. 1982, 1985). The government and industry setup a safety development process based on HARM and the Haddon matrix, which provide a logical framework for injury prevention (Haddon et al. 1964, Haddon 1972, Williams 1999). The automotive manufacturers started safety initiatives, for example, General Motors (GM) started the Vehicle Safety Improvement Program (VSIP) to systematically address safety improvements in a sensible manner based on HARM reductions (Wilson 1983). One initiative involved improving fuel systems for vehicles in severe rear impacts to reduce the risk of fires. Another example is that the Federal Motor Vehicle Safety Standard (FMVSS) 301 barrier impact was increased to 35 mph from 30 mph in the standard and represented a 36% increase in energy absorption of the crash. Managing risk sensibly was the basis for industry support for federal programs for injury prevention (NAS 1985, Viano 1989a,b, 1990). NHTSA continues to provide safety priorities based on the incidence and severity of injury to motor-vehicle occupants and other accident conditions, as part of cost-effective regulation.

Efforts to protect children in rear seats should be based on how they are injured in field accidents, including front, side, rear and rollover impacts. What are the sources of HARM in rear impacts?

Early Field Data in 2003: Parenteau, Viano (2003a, b) studied injuries to rear-seated occupants using field accidents collected by NHTSA. The 1991-1999 national Automotive Sampling system Crashworthiness Data System (NASS-CDS) provided information on crashes, occupants and injuries. In Part I, Parenteau, Viano (2003a) studied adults and teenagers. The field injury data and the literature identified priorities for adults and teenagers in rear seats, including: 1) load-limiting belts with cinching and good restraint geometry, 2) Elastane (EA) material for the seatback, side interior, and B-pillar, 3) reduced contact velocity with a seatback, side interior and B-pillar, 4) improved containment with inflatable side curtains and laminated side glass, and 5) other technologies, such as inflatable belts.

In Part II, Parenteau, Viano (2003b) studied children 4-12 years old and toddlers-infants 0-3 years old. The data was separated because of the use of infant, child, and booster seats involve different injury mechanisms and tolerances. Table 1 shows that children 4-12 years old seated in rear seats are seriously injured most often in frontal impacts (48%), followed by side impacts (23%) and rollovers (21%). Only 5.5% of rear-seated children were seriously injured in rear impacts. The risk of serious injury to rear-seated children was highest in rollovers (3.7%) followed by front (1.4%) and side (1.2%) impacts. The risk for rear-seated children in rear impacts is 0.6%, the lowest among crash types. In that study, the priorities suggested were improving the proper use of belt restraints and child safety seats used in the rear seats and improving the energy absorption characteristics of the front, side and overhead interior around rear children. Injuries to rear-seated children in rear impacts did not emerge in the list of HARM to children.

TABLE 1

4-12 year old annual serious injury in crashes with 1991-99 NASS-CDS (Parenteau, Viano 2003b).

| 4-12 years old | General Area of Damage | | | | | |
|---|---|---|---|---|---|---|
| | Front | Side | Rear | Roll-over | Other/Unk | Total |
| Exposed | | | | | | |
| Front seat | 39,749 | 12,712 | 10,477 | 3,518 | 3,568 | 70,023 |
| Rear seat | 43,160 | 24,376 | 12,186 | 7,450 | 12,238 | 99,413 |
| All | 82,910 | 37,088 | 22,664 | 10,968 | 15,806 | 169,436 |
| Serious injury (MAIS 3+) | | | | | | |
| Front seat | 620 | 137 | 0 | 116 | 11 | 884 |
| Rear seat | 621 | 300 | 71 | 272 | 32 | 1,296 |
| All | 1,240 | 438 | 71 | 388 | 43 | 2,180 |
| Serious injury in rear seats | | | | | | |
| distribution | 47.9% | 23.1% | 5.5% | 21.0% | 2.5% | 100.0% |
| risk | 1.44% | 1.23% | 0.58% | 3.65% | 0.26% | 1.30% |

The distribution of serious injuries was assessed for belted and unbelted child occupants 4-12 in frontal impacts. Head and upper extremities were the body regions with most frequent serious injuries (AIS 3+). The seatback, head restraint, B-pillar and interior surfaces were common injury sources. Various mitigating actions were proposed to reduce injuries. Foremost was the application of FMVSS 201 to the seatback and interior surfaces below the beltline. This would address the contact areas most likely engaged by belted and unbelted children. Other areas included using EA material on the back of front seats, B-pillar and interior surfaces below the beltline, improved cinching the occupant to the child seat, reducing contact velocity with side interior and B-pillar and using EA material for side structures above the beltline, such as side curtains.

Three-quarters (74%) of toddlers-infants 0-3 years old exposed to towaway crashes are in the second row as compared to 22% in the front passenger seat and 4% in other positions. The risk of serious injury is 1.1% in the rear seats and 1.2% in front seats. The risk was statistically similar (p<0.10). Unbelted 0-3 year old toddlers-infants had 5.8 times greater risk of serious injury than those restrained in a child seat. There were too few cases of vehicle crashes with airbags available to assess relative risk differences between the front and rear seats for 0-3 year old children. Based on the most frequent injuries by restraint use and crash type, a series of safety areas were identified to improve protection for children and others in the rear seats.

Field Data in 2008: Viano, Parenteau (2008a) studied the fatality risk of 0-7 year old children in rear seats. Table 2 shows that for a rear-seated child, the highest risk of fatality was in rollover crashes (1.3%), followed by side impacts (0.4%). The risk varied by the principal direction of force (PDOF) in the collision. For a left second row-seated child, the highest risk was in seven o'clock impacts at 2.74% followed by four o'clock impacts at 2.48%. The risk was 0.44% in 6 o'clock impacts. Overall, children 0-7 were safest in the center rear seat (0.27%) followed by the left rear (0.29%) and right rear (0.32%). There was a higher risk for right-rear-seated children because of intersection crashes with the vehicle turning left in front of oncoming traffic and right-side impacts.

TABLE 2

0-7 year old child fatalities in crashes with 1996-2005 NASS-CDS (Viano, Parenteau 2008a).

| 0-7 years old | General Area of Damage | | | | | |
|---|---|---|---|---|---|---|
| | Front | Side | Rear | Roll-over | Other/Unk | Total |
| Exposed NASS-CDS | | | | | | |
| Front seat | 116,948 | 67,907 | 55,451 | 34,861 | 9,704 | 284,870 |
| Rear seat | 671,616 | 271,563 | 128,104 | 90,576 | 84,598 | 1,246,458 |
| All | 788,564 | 339,470 | 183,555 | 125,437 | 94,302 | 1,531,327 |
| Fatal FARS | | | | | | |
| Front seat | 755 | 320 | 30 | 386 | 26 | 1,517 |
| Rear seat | 1,081 | 1,055 | 327 | 1,137 | 102 | 3,702 |
| All | 1,836 | 1,375 | 357 | 1,523 | 128 | 5,219 |
| Fatal in rear seats | | | | | | |
| distribution | 29.2% | 28.5% | 8.8% | 30.7% | 2.8% | 100.0% |
| risk | 0.16% | 0.39% | 0.26% | 1.26% | 0.12% | 0.30% |

Viano, Parenteau (2008b) analyzed all cases of serious injury to children 0-7 years old in the second row in rear impacts to identify priorities for safety improvements. Individual rear-impact cases were reviewed to better understand injury mechanisms of children in the second row. The cases were obtained from the 1997-2005 NASS-CDS electronic database. Rear impact cases were chosen based on serious-to-fatal injury (MATS 3+F).

There were nineteen injured children involved in sixteen rear impact crashes. Thirteen injuries (13 or 68.4%) were associated with >12" intrusion of their seating area, which pushed the child forward. Since intrusion occurred early during the collision forces and vehicle acceleration, it occurred before much rearward rotation of the front seats. This meant that the child was pushed into a relatively upright front seat. There was only one child (5.3%) who was injured by rearward rotation of the front seatback.

The study concluded that stiffening front seats was not a reasonable approach to improving safety of second row seated children. Limiting head excursion and forces on the upper body of the child seemed more appropriate in the most severe crashes where the second row child is injured by intrusion pushing them forward into the front seatback in rear impacts or the child is displaced forward contacting the front seatback, B-pillar or other interior components in frontal crashes.

Viano, Parenteau (2008c) explored the role of the principal direction of force (PDOF) and seating position on injury risks for rear and front-seated occupants. The occupant closes to the point of impact had the highest risk of injury and death.

Public Attention to Rear-Seated Children in Rear Impacts: On Mar. 9, 2016, Mr. Clarence M Ditlow from the Center for Auto Safety petitioned NHTSA to address the protection of children seated in the second row in rear crashes (Ditlow, 2016). The petition urged NHTSA to "take action to protect children riding in the rear seats of vehicles from the risk of being killed or severely injured when struck by a 'collapsing' front seatback in a rear-end crash."

On May 25, 2016, Senators E. J. Markey and R. Blumenthal sent letters of inquiry to automotive manufacturers on the same issue (Markey, Blumenthal 2016). The petition and inquiry refer to industry "efforts to protect passengers against the threat of front seatback failures." It focuses on second-row occupants, particularly children in rear impacts.

On Jun. 23, 2016, the Alliance of Automobile Manufacturers responded to the Senator's letter (AAM 2016). They raised concerns for raising seatback strength beyond current standards. They noted that automakers design and engineer their vehicles to achieve the best overall occupant protection.

Updates on Field Data in 2016 and 2020: At NHTSA's request, Viano, Parenteau (2016) updated the earlier analysis of seriously injured second row children in rear impacts and provided the information to NHTSA on Jun. 3, 2016. The eight-year update identified twenty-four children (five plus the original nineteen) who were seriously injured in twenty-one rear impacts (five plus the original sixteen). The new electronic cases were added to the original dataset. Seventy-one percent (71%, seventeen out of twenty-four) of the electronic cases in the 1997-2013 NASS-CDS involved intrusion pushing the child forward into the back of the front seat, the B-pillar or other front structures. The conclusions of the original analysis remain unchanged and are strengthened by the additional cases. The five new cases were very severe rear impacts with delta V of 25-37 mph. They involved substantial intrusion of the rear seating area. The authors cautioned that stiffening front seats, such as with all-belts-to-seat (ABTS) seats, may increase injury risks for second row children because of the more frequent frontal crashes where children need a yielding front seatback even when belted in the second row.

Parenteau, Viano (2020) updated the analysis of rear-seated children 0-7 years old in rear crashes using 1997-2015 NASS-CDS with 1994+ model year vehicles. The distribution and risk of serious-to-fatally (MATS 3+F) injured children in the rear found that the greatest number of second row-seated children were injured in frontal (30%) and side (21%) impacts. The highest risk for serious injury in second row seated children was in rollovers (1.72%±0.36%) followed by rear crashes (0.75%±0.56%).

Individual rear and frontal impact cases were reviewed to better understand injury mechanisms of children seated in the second row. There were fifteen injured children involved in fourteen rear impact crashes. Seven of the cases were new and not previously included in the 2008 study. The analysis of the fifteen children indicated that half were associated with significant intrusion (12+ in) into their seating area, pushing the child forward. The case review indicated that the front seat remained in its pre-crash position or was pushed forward in seven out of eleven cases. The front seatback rotated rearward in four out of eleven cases. Two involved a severe-to-fatal injury (AIS 4+) where the child was pushed forward due to significant intrusion.

TABLE 3

0-7 year old serious injury in crashes with 1997-2015 NASS-CDS (Viano, Parenteau 2020).

| 0-7 years old | General Area of Damage | | | | | |
|---|---|---|---|---|---|---|
| | Frontal | Side | Rear | Rollover | Other/ Unk | Total |
| Exposed | | | | | | |
| Rear seat Serious injury (MAIS 3+) | 966,042 | 473,525 | 205,654 | 94,739 | 450,788 | 2,190,748 |
| Rear seat Serious injury in rear seats | 3,720 | 2,570 | 1,539 | 1,634 | 3,097 | 12,560 |
| distribution | 29.6% | 20.5% | 12.3% | 13.0% | 24.7% | 100.0% |
| risk | 0.39% | 0.54% | 0.75% | 1.72% | 0.69% | 0.57% |

NHTSA's Reply: On 1-13-17, Administrator Rosekind from NHTSA replied to the Senator's letter and petition (Rosekind 2017). He said that NHTSA is obligated to consider the potential benefits, as well as the drawbacks. For example, a standard that prescribes a stronger seatback structure to prevent large seatback deformation in high-speed rear impacts, without consideration of how this will contribute to the potential for whiplash injury in frequent low-speed rear crashes, may not optimize overall injury protection. Through multiple projects, including crash test dummy testing and research, NHTSA is working toward reducing the occurrence of rear-impact crashes, as well as mitigating their severity. NHTSA also continues to work toward reducing the occurrence of rear-impact crashes as well as mitigating their severity. NHTSA's encouragement of industry to voluntarily adopt Automatic Emergency Braking technology as standard equipment by 2022 will move us closer to that goal.

Neither NHTSA nor the Senators identified the problem that was the basis for the inquiry. Both focused on "solutions" without a clear description of the mechanisms of child injury in rear seats in rear impacts. The main point is what are the sensible means of improving safety that addresses the mechanism of injury to children in rear seats in rear impacts based on HARM. The Senators focused on front seatback strength. NHTSA replied that more research was being conducted and that automatic braking technology reduced rear impacts. They did not define what proportion of child injury was related to the "solution" or how much benefit-disbenefit may occur with the "solution."

NHTSA raised the problem of tradeoffs. However, the tradeoff is not whiplash in a front occupant for serious injury to a rear-seated child. The tradeoff is for serious injury to front occupants for serious injury to rear-seated children. Viano, Parenteau (2008d) studied serious injury in low-speed rear impacts and found up to 20% occurred in crashes with less than 15 mph delta V. The injuries involved older occupants, many with spinal disorders that were injured by forces on their chest with upright seats. The tradeoff involved different risks for serious injury for occupants in front and rear seats.

Front Occupant Injury in Lower-Speed Rear Impacts: Seats have become stronger over the past decades (Viano, White 2016). New injury mechanisms have emerged in field accidents with seats that remain upright in rear impacts. One mechanism is hyper-extension around the upright seatback frame causing fracture-dislocation of the thoracic spine.

Viano (2011) identified four cases of the upper body hyper-extending rearward around the frame of the seatback. The fractures were very severe and often involved complete transection of the thoracic spine. The thoracic spine extended around the frame of the seatback, which concentrated forces on the spine, acted as a fulcrum and caused hyper-extension fracture-dislocations.

Another mechanism is spinal fracture of occupants who remain in the seat and experiences forces on the chest that extend the spine and exceed their tolerance. Viano et al. (2019) identified extension fractures of the thoracic spine with the occupant remaining in the seat during a rear impact. The head, neck and shoulder moved rearward loading the upper seatback and head restraint as the occupant was accelerated forward. The forces on the spine were sufficient to try and extend the thoracic spine. In an occupant with DISH and other calcifications of the spine, the spine tried to extend but fractured near the apex of the thoracic kyphosis. The mechanism of injury involved older occupants with spinal disorders. The spinal fractures occurred in low-to-moderate speed rear impacts and were related to the lower tolerance of older occupants.

TABLE 4

Mechanisms for 0-7 years old serious injury in rear seats in rear impacts.

| 0-7 years old | Year Published | | |
|---|---|---|---|
| | 2008 | 2016 | 2020 |
| Serious Injury | | | |
| rear seats | | | |
| Publication | SAE 2008-01-1850 | Update to NHTSA 2006-2013* | SAE 2020-01-1215 |
| NASS-CDS years | 1997-2005 | 2006-2013* | 1997-2015 |
| MY vehicles | 1990+ | 1990+ | 1994+ |
| # crashes | 16 | 21 | 14 |
| # children | 19 | 24 | 15 |
| Mechanism of injury | | | |
| Intrusion | 13 (68.4%) | 17 (70.8%) | 7 (50.0%) |
| Pillars-interior | 5 (26.3%) | 6 (25.0%) | 6 (42.9%) |
| Front seatback | 1 (5.3%) | 1 (4.2%) | 1 (7.1%) |
| Unknown | — | — | 1 |
| total | 19 (100%) | 24 (100%) data | 14 (100%)** |

*adding to 1997-2005 NASS-CDS
**percent of known cases,

The Safety Issue: The issue is the protection of rear-seated children in rear impacts. Table 4 summarizes the studies on children 0-7 years old that were seriously injured in rear impacts while seated in rear seats. The field data and cases show the primary mechanism of injury is intrusion of rear structures accelerating the child into a relatively upright front seat. The solution with intrusion is not to strengthen front seats because that would increase the forces compressing the child.

The concept presented here is to guard the area around the child by a ring structure that shields the child from being crushed by intrusion pushing them into upright front seats. The ring structure can be used in existing and future vehicle with front seats of any type or strength. The ring structure can be used when there is a child in the rear seat and can be stowed if there isn't a child in the vehicle. It can be moved from vehicle to vehicle.

The "red herring": The notion that front seats have to be strengthened is a "red herring." Stronger seats would require years to phase into production and would not address the millions of vehicles on the road today with children riding in rear seats. Stronger front seats would increase the forces compressing the child with intrusion pushing them forward. A solution is an after-market product. A wrap-around shield or ring that accommodates existing child seats and is compatible with the rear seats of vehicles in use and manufactured in the future.

There has been an increase in front seat contact with rear children in the 2020 compared to the 2008 or 2016 analysis of field accidents. Front seats have gotten stronger and vehicles have improved rear structures in recent years. The wrap-around shield presented here is a solution for rearward rotation of front seats. It limits front seatback rotation to 40-45 deg or another specified limit. The frame supports the front seatback and prevents front seatback or occupant contact with a child in the rear.

History of Universal Attachments for Child Seats, ISOFix and lower anchors and tethers for children (LATCH): In 1972, the Federal standard for child seat tethering involved a static pull test specified in FMVSS 213. In 1981, FMVSS 213-80 was revised and included a sled test that specified a 32" limit on forward excursion of the child dummy with or without a tether when the forward-facing child seat was subjected to a 30 mph test. In 1985, the standard was revised so child seats had to pass the sled test without a tether. As a result, top tethers became less prevalent until the mid-1990's when field data on the benefits of child seats with tethers prompted renewed interest.

In the 1990's, ISO (International Standards Organization) developed a universal child restraint anchorage system that allowed child seats to install in vehicles without seatbelts. It was called ISOFix and involved two bars in the seat bight and rigid lower anchors on the child seat. ISOFix continued to evolve with flexible lower anchors on the child seat.

NHTSA mandated that top tether anchors must be in place in new cars and top tether straps must be on all front-facing child seats starting with 80% after Sep. 1, 1999 and 100% after Sep. 1, 2000. A top tether prevented the child safety seat from tipping forward in a crash and reduced the movement of a child's head.

NHTSA issued FMVSS 225 (the LATCH standard) that lower anchors be phased-in on 20% of vehicles after Sep. 1, 2000, 50% after Sep. 1, 2001 and 100% after Sep. 1, 2002. LATCH required hooks for the attachment of lower tethers on child seats. LATCH was a variation of ISOFix in the U.S. It made the installation of child seats easier by standardizing the attachments to the vehicle and eliminating incompatibilities with vehicle seatbelt systems.

The Revision to FMVSS 301: In 2003, NHTSA revised FMVSS 301 to a more severe crash test using a lighter offset deformable barrier (ODB) weighing 3,015 lb. and a higher test speed of 50 mph with 70% offset (NHTSA 2003). The revised FMVSS 301 (called FMVSS 301R) had higher kinetic energy than the original FMVSS 301 standard, which used a 30 mph rear impact with a 4,000 lb. rigid moving barrier (RMB). The phase-in for compliance with the revised standard was 40% in 2007 MY (model year) vehicles, 70% in 2008 MY and 100% in 2009 MY vehicles.

NHTSA advanced occupant protection with the revision to FMVSS 301. Viano, Parenteau (2016) found compliance with the revision reduced fatalities. For example, the fatality risk was 20.6% in the 1996-2001 MY vehicles, 17.3% in the 2002-2007 MY and 15.0% in the 2008+MY vehicles in rear impacts. There was a 27.1% reduction in risk with 2008+ MY vehicles manufactured after the revision to FMVSS 301.

The rear structures of vehicles were strengthened for FMVSS 301R reducing intrusion of the rear occupant compartment in severe rear impacts. This has preserved space in rear seats increasing the severity of rear crashes where intrusion pushes rear-seated children forward. However, Parenteau, Viano (2020) found intrusion remained the primary source of serious injury in rear impacts, even as rear structures have improved.

Today, there remains a need to improve the protection of children in rear seats. Viano, Parenteau (2021) studied the change in seating position of children in towaway crashes from 1989-2019. 27.9% of 0-2 year old children were in the right-front seat in 1989-95. The fraction decreased to 0.40% in the 2017-19. For 3-7 year old, 32.1% were in the right-front seat in 1989-95 and 3.2% in 2017-19. There has been a steady decrease in 0-7 year old children using the right-front seat. For 8-12 year old, there was a step decline in use of the right-front seat from 39.5% in 1989-95 to 23.2% in the 2017-19. With most children riding in rear seats, their protection in rear seats is important. The concept presented here is for a wrap-around shield to be used in modern vehicles because intrusion remains the primary source of injury. The shield also prevents the front seat or occupant from rotating rearward into a rear-seated child. The shield or ring prevents seatback rotation and possible occupant-to-occupant contact.

A primary cause of injury to rear-seated children in rear end collisions is by the rear seatback being pushed forward by intrusion of rear vehicle-structures, causing the child to be accelerated into the front seatback. This can occur with the front seatback in a pre-impact condition or with rearward rotation toward the rear-seated occupant due to inertia of a front seated occupant loading the front seatback during a rear vehicle impact. Stated alternately, the front seated occupant deforms their seatback by their mass during the rear end collision causing the front seatback to move nearer the rear-seated occupant. One response for contending with this potential impact has been to strengthen the front seatback from rotating. However, strengthening the front seatback from rotating, can hinder the front seatback from rotating forward upon impact by a rear-seated child in the more-often frontal impacts and increasing the forces on the child. Embodiments of the present disclosure are directed to a wrap-around shield that forms a protective envelope around a child safety seat and child to protect the child during a vehicle collision. The wrap-around shield is arranged to form a protective barrier between the child safety seat and child and the front seatback, such that in the event of a collision, the front seatback will load the wrap-around shield rather than the child.

Senate Bill 5.4122: On 7-1-20, Senators R. Blumenthal and E. Markey introduced S.4122 in the 116th Congress, 2D Session to require the Secretary of Transportation to issue a final rule revising motor vehicle seat back safety standard. The rationale behind the concept presented here and the concept address the issue 5.4122 refers to and is based on the understanding of how children in the rear seat are injured in rear impacts and what steps can be taken to reduce their risks. The wrap-around shield works in existing vehicles with varying from seat design and strength. It is an aftermarket component with wider and immediate benefits if provided in the marketplace. Parents who would purchase and use the wrap-around shield would be informed that the shield may increase their risks of injury, while improving the protection of their children and family in rear seats.

Referring to FIGS. 1, 2A, 2B, and 3, a side-view and plan-view of one embodiment of a wrap-around shield 100 is shown. As shown, the wrap-around shield 100 includes a frame 102 configured to wrap around a child safety seat 132. The frame 102 includes a first end 104, a first side member 106, a front member 108, a second side member 110, and a second end 112. The first end 104 is connected to the first side member 106. The first side member 106 is connected to the front member 108. The front member 108 is also connected to the second side member 110. The second side member 110 is connected to the second end 112. The first end 104 is further connected to a first connecting member 114 and the second end 112 is further connected to a second connecting member 116. As illustrated, the first end 104 is not directly connected to the second end 112, such that a gap is formed between the first end 104 and the second end 112. In other embodiments, the first end 104 and the second end 112 are connected to form a single end that completes a closed loop of the frame 102. In these closed loop embodiments, both the first connecting member 114 and the second connecting member 116 are connected to the single end member. The cross-section of the wrap-around shield can be closed, open or a combination to facilitate connection to the LATCH anchors and wrap-around the child seat and child.

Figure 2A:
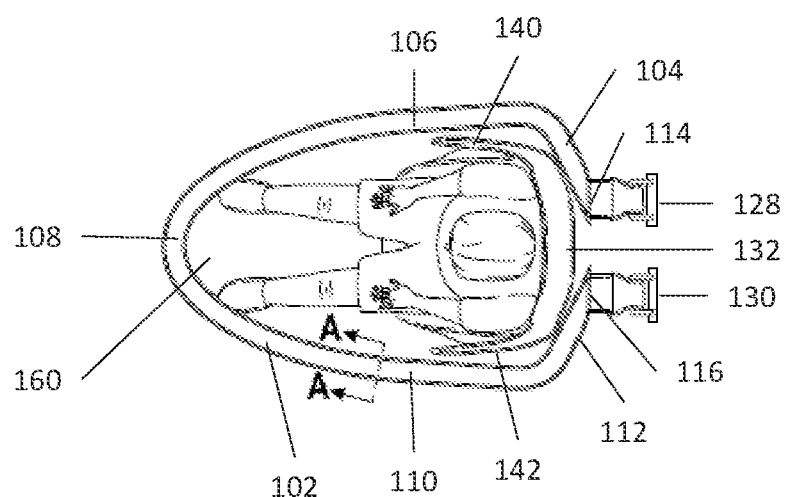
FIG. 2A illustrates a plan-view of a wrap-around shield in accordance with embodiments of the present disclosure.
Figure 3:
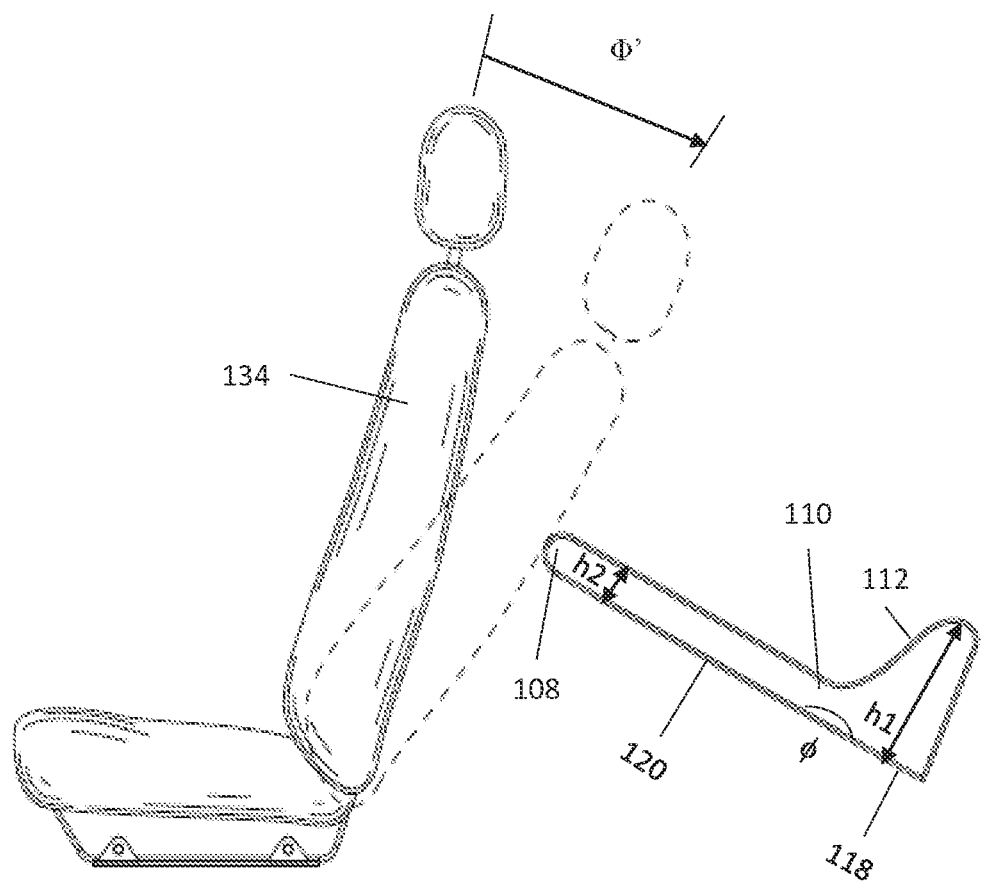
FIG. 3 illustrates a side-view of a wrap-around shield in accordance with embodiments of the present disclosure.

As seen in FIG. 2A, the first end 104 and the second end 112 are each curved inward toward each other and around the back rest 144 of the child safety seat 132. A contour of an inner surface of first end 104 and the second end 112 can be configured to match a contour of an outer surface of the back rest 144 of the child safety seat 132. In this sense, the inner surface of first end 104 and the second end 112 can be arranged to be flush with the outer surface of the back rest 144 of the child safety seat 132. The first end 104 and the second end 112 each have a profile that elevate while moving away from the first side member 106 and the second side member 110. As seen in FIG. 3, the first end 104 and the second end 112 each have profiles that increase in height, such that a height h1 of the first end 104 and the second end 112 is greater than a parallel height h2 of a balance of the frame 102. As seen in FIG. 3, the height increases as the first end 104 and the second end 112 curve toward each other.

The first end 104 is connected at a non-linear angle $\phi$ to the first side member 106. The second end 112 is connected at the non-linear angle $\phi$ to the second side member 110. Therefore, a base 118 of the first end 104 is not parallel with a base 120 of the first side member 106. Also, a base 118 of the second end 112 is not parallel with a base 120 of the second side member 110. The non-linear angle $\phi$ causes the first side member 106 and the second side member 110 to tilt away from a rear seat 136 as the first end 104 and the second end 112 rest on the rear seat 136. The non-linear angle $\phi$ can be selected such that the front seatback 134 is perpendicular with the first side member 106 and the second side member 110 in the event that the front seatback 134 rotates rearward at an angle $\Phi'$ and loads with the front member 108 as illustrated in FIG. 3. The predetermined angle of rotation $\phi'$ can be between the front seatback 134 at an upright 0° position from the ground to a desired number of degrees to make contact with the frame 102.

The first side member 106 and the second side member 110 are generally tubular in structure and extend away from the first end 104 and the second end 112, and toward the front member 108. In some embodiments, the first side member 106 and the second side member 110 have a curved tubular structure, and as seen in FIG. 2A are curved such that they are concave in relation to one another. In other embodiments, the first side member 106 and the second side member 110 have a straight tubular structure.

Each of the first side member 106 and the second side member 110 have length l that is greater than a length of a right armrest 140, and a left armrest 142 of the child safety seat 132. As seen in FIG. 2A, each of the first side member 106 and the second side member 110 converge toward one another as they extend away from their respective first end 104 and second end 112 and toward the front member 108. As such, the connected first side member 106, front member 108, and second side member 110 form a horseshoe-shaped structure.

Figure 2B:
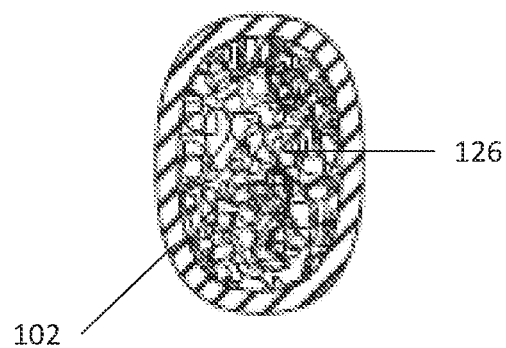
FIG. 2B illustrates a cross-section of a wrap-around shield in accordance with embodiments of the present disclosure.

Referring to FIG. 2B, a cross-section of the frame 102 across line AA of FIG. 2A is shown. As illustrated, the frame 102 has an inner portion 126 running along the inside of the frame 102. The inner portion 126 can be hollow, however, as illustrated, the inner portion 126 can include a physical structure (e.g., a foam, grid-like structure, impact absorption gel, etc.). The physical structure can be configured to reinforce the structural integrity of the frame 102. The physical structure can be configured to receive a force from the front member 108 and direct the force towards the first end 104 and the second end 112. The physical structure can also be comprised of a material configured to dissipate a force applied to the front member 108.

Figure 4:
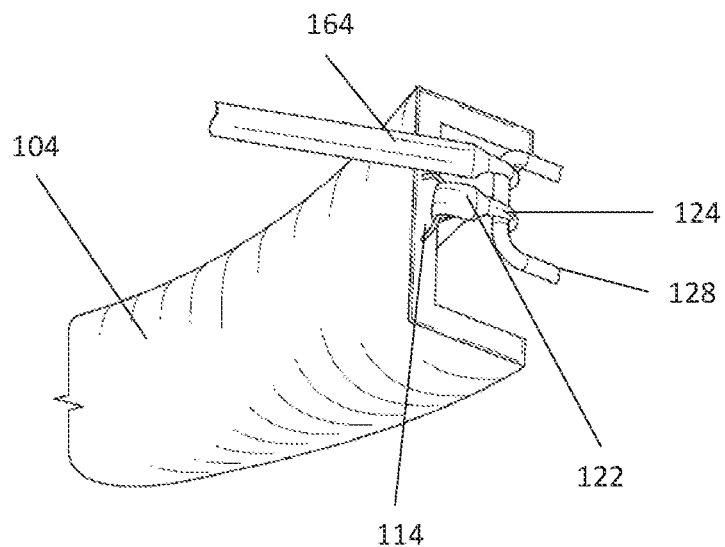
FIG. 4 illustrates a wrap-around shield connected to a rear seat lower anchors and tethers for children (LATCH) system in accordance with embodiments of the present disclosure.

Referring to FIGS. 2A and 4, the first connecting member 114 and the second connecting member 116 are respectively attached to the first end 104 and the second end 112. The first connecting member 114 and the second connecting member 116 are connections for connecting the frame 102 to the lower first and second anchors 128 130 of a vehicle. The first connecting member 114 includes a hitch for attaching to a tether 122. For example, as illustrated in FIG. 4, the first connecting member 114 is connected to the tether 122, which includes a hook 124 for connecting to the lower first anchor 128. The tether 122 could also include a mechanical latch (not shown) for connecting to the lower first anchor 128. The child safety seat 132 can also be connected to the lower first anchor 128 via a child safety seat connecting mechanism 164 (e.g., a tether attached to a hook). The second connecting member 116 can be connected to the lower second anchor 130 similarly as the first connecting member 114 is connected to the lower second anchor 130. The first connecting member 114 and the second connecting member 116 can also include rigid latches, or other appropriate connecting apparatus.

Referring to FIG. 3, an illustration of a rotating front seatback 134 making contact with frame 102 is shown. As illustrated, the wrap-around shield 100 is as it would be arranged on a rear seat 136. As the front seatback 134 rotates rearward, it makes contact with the front member 108 of the wrap-around shield 100. In some embodiments, the length l of the first side member 106 and the second side member 110 and the angle φ can be configured such that contact between the front seatback 134 and the frame 102 is initiated once the front seatback 134 rotates rearward to the predetermined angle of rotation Φ'.

As seen in FIGS. 1 and 2A, the child safety seat 132 is arranged on a rear seat 136. The rear seat 136 is secured to a vehicle floor through a mounting assembly. The rear seat 136 includes a cushion trim that is disposed about portions of a cushion frame that is secured to the mounting assembly. The child safety seat 132 is arranged on and supported by the rear seat 136. The frame 102 wraps around a seatback 138, a right armrest 140, and a left armrest 142 of the child safety seat 132. The first end 104 is arranged proximate to the back rest 144 of the child safety seat 132. The first side member 106 is arranged proximate to the right armrest 140 of the child safety seat 132. The second side member 110 is arranged proximate to the left armrest 142 of the child safety seat 132. The first side member 106, the front member 108, and the second side member 110 form a space 160 between the front member 108 and the child safety seat 132.

When the wrap-around shield 100 is installed, it rests on the rear seat 136 and is braced against the rear seatback 148 to maintain a stable position, and a space 160 is formed to the front of the child's torso. The frame 102 is of ample strength to resist collapse when the forces of a crash displace it toward the front seatback 134 and/or if the front seatback 134 rotates rearward toward the child. The child sits in the child safety seat 132 and is protected by the frame 102 loads with the front seatback 134 and displaces its force to minimize the collapse of the space 160 around the child. The wrap-around shield 100 connects to the LATCH of a vehicle and is compatible with child safety seats that are rear-facing, convertible, forward-facing or booster. The embodiments can be used with older vehicles without LATCH by the use of an adaptor bracket attaching to the lap belt anchors for the rear seat 136.

In some rear vehicle collisions, a front seatback occupant can load the front seatback 134, which then rotates in a rearward direction. As the front seatback 134 rotates rearward, it makes contact with the front member 108. The torque is transferred to the front member 108 and through the first side member 106 and the second side member 110. The forces from the first side member 106 and the second side member 110 are transferred to the first end 104 and the second end 112. The first end 104 and the second end 112 are braced against the rear seatback 148. As the first end 104 and the second end 112 are pushed rearward, a resistive force in the form of friction caused by the interface of the first end 104 and the second end 112 and the rear seat 136 is generated. The friction force is in opposition to the force transmitted from through the first side member 106 and the second side member 110. Additionally, a reaction force is formed by the impact of the first end 104 and the second end 112 against the rear seatback 148. The reaction force moves in a direction opposite of the force created by the first end 104 and the second end 112 colliding with the rear seatback 148. The reaction force pushes back against the front seatback 134 back and braces the frame 102 against the force from the impact between the front member 108 and the front seatback 134. Therefore, although the frame 102 may partially collapse due to impact with the front seatback 134, the reactive force, the resistive force, the space 160, and the geometry of the frame structure work to prevent the collapsed frame 102 from impacting with injurious forces on a child in the child safety seat 132.

Figure 5:
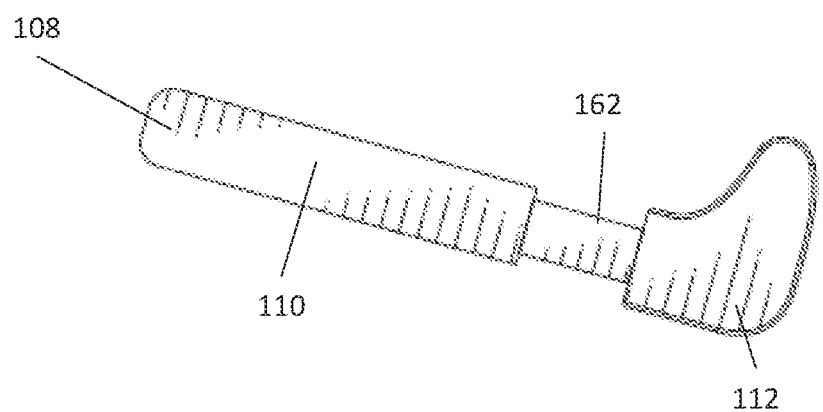
FIG. 5 illustrates a side-view of an extendable wrap-around shield in accordance with embodiments of the present disclosure.

Referring to FIG. 5, a side-view of another embodiment of the wrap-around shield 100 is shown. In this embodiment, the wrap-around shield 100 includes a first extendable member (not shown) and a second extendable member 162. The first extendible member is configured to be slidably or telescopically received at one end within the first side member 106 and at an opposite end within the first end 104. The second extendible member 162 is configured to be slidably or telescopically received at one end within the second side member 110 and at an opposite end within the second end 112. The first extendable member and the second extendable member 162 allow the first side member 106 and the second side member 110 to be slid away from and be spaced apart from the first end 104 and the second end 112. The first side member 106 and the second side member 110 can also be slid towards the abut the first end 104 and the second end 112. In this position, the first extendible member and the second extendible member 162 remain concealed within wrap-around shield 100. The first extendible member and the second extendible member 162 allow for an adjustment of a distance between the front seat 134 and the front member 108.

Figure 6A:
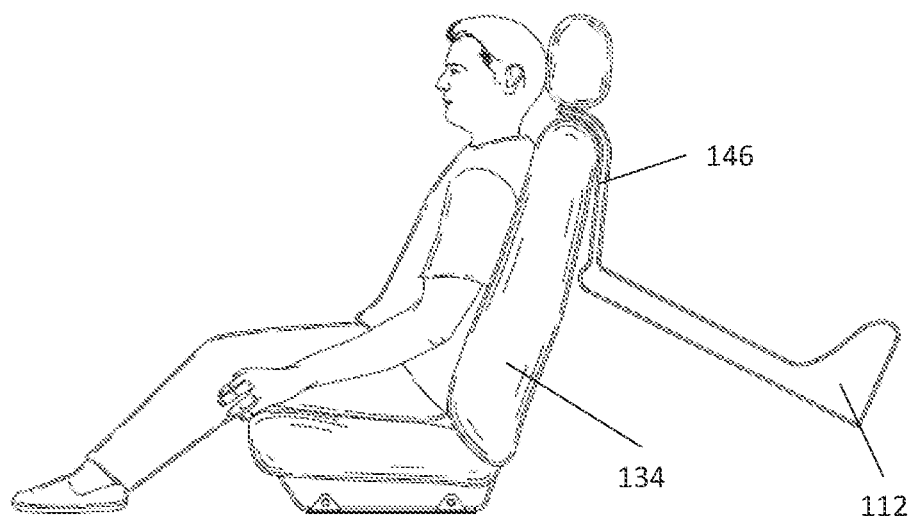
FIG. 6A illustrates a side-view of a wrap-around shield with a bracing member in accordance with embodiments of the present disclosure.
Figure 6B:
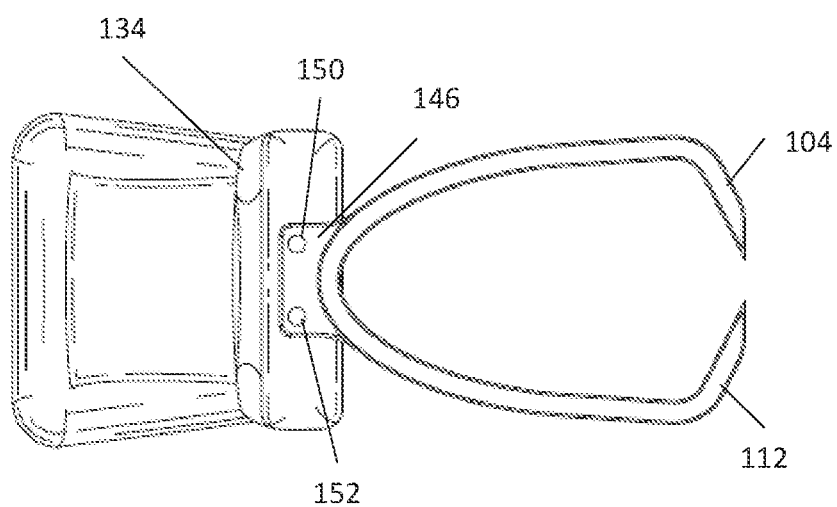
FIG. 6B illustrates a plan-view of a wrap-around shield with a bracing member in accordance with embodiments of the present disclosure.

Referring to FIGS. 6A and 6B, a side-view and a plan-view of another embodiment of the wrap-around shield 100 are shown, respectively. The wrap-around shield 100 further includes a bracing member 146 connected to the front member 108. The bracing member 146 includes a lip with a first opening 150 and a second opening 152 that are spaced apart to permit the prongs of a head restraint to be inserted and into a seat bracket headrest holder of the front seatback 134. When the wrap-around shield 100 is installed, the lip rests on a top portion of the front seatback 134. When the prongs of the head restraint are inserted into the first opening 150 and the second opening 152 and into the front seatback 134 and the frame 102 is connected to the lower first and second anchors 128 130, the wrap-around shield 100 is restrained from making any lateral movement. Furthermore, the front seatback 134 is restrained from rotating forward or rearward.

Figure 7A:
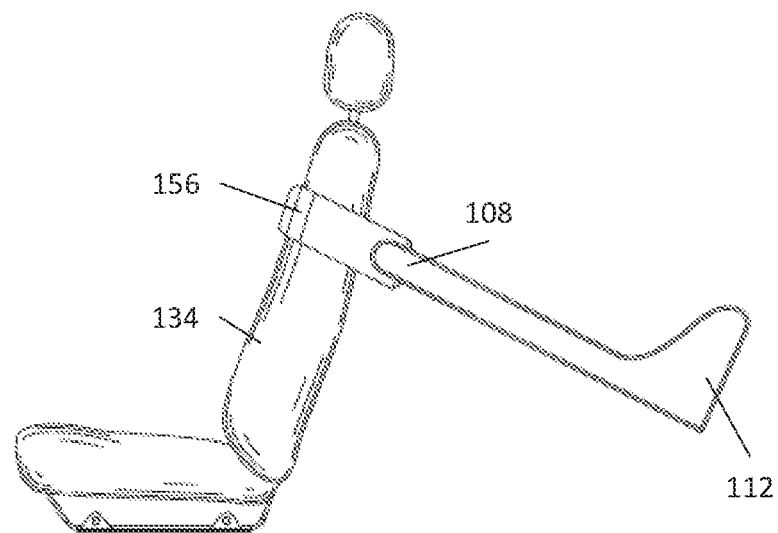
FIG. 7A illustrates a side-view of a wrap-around shield with a jaw member in accordance with embodiments of the present disclosure.
Figure 7B:
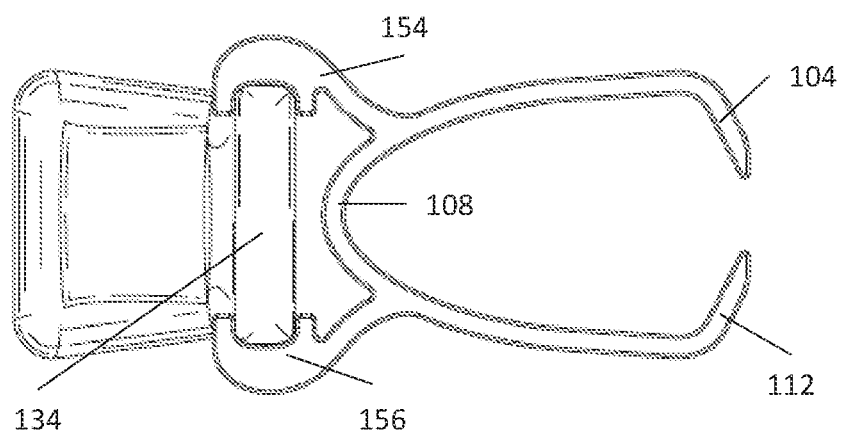
FIG. 7B illustrates a plan-view of a wrap-around shield with a jaw member in accordance with embodiments of the present disclosure.

Referring to FIGS. 7A and 7B, a side-view and a plan-view of yet another embodiment are shown, respectively. In this embodiment, the wrap-around shield 100 further includes a first jaw member 154 and a second jaw member 156 connected to the front member 108. The first jaw member 154 and the second jaw member 156 clamp the wrap-around shield 100 to the sides of the front seatback 134. When the first jaw member 154 and the second jaw member 156 are clamped to the front seatback 134 and the frame 102 is connected to the lower first and second anchors 128 130, the wrap-around shield 100 is restrained from making any lateral movement. Furthermore, the front seatback 134 is restrained from rotating forward or rearward.

Figure 8:
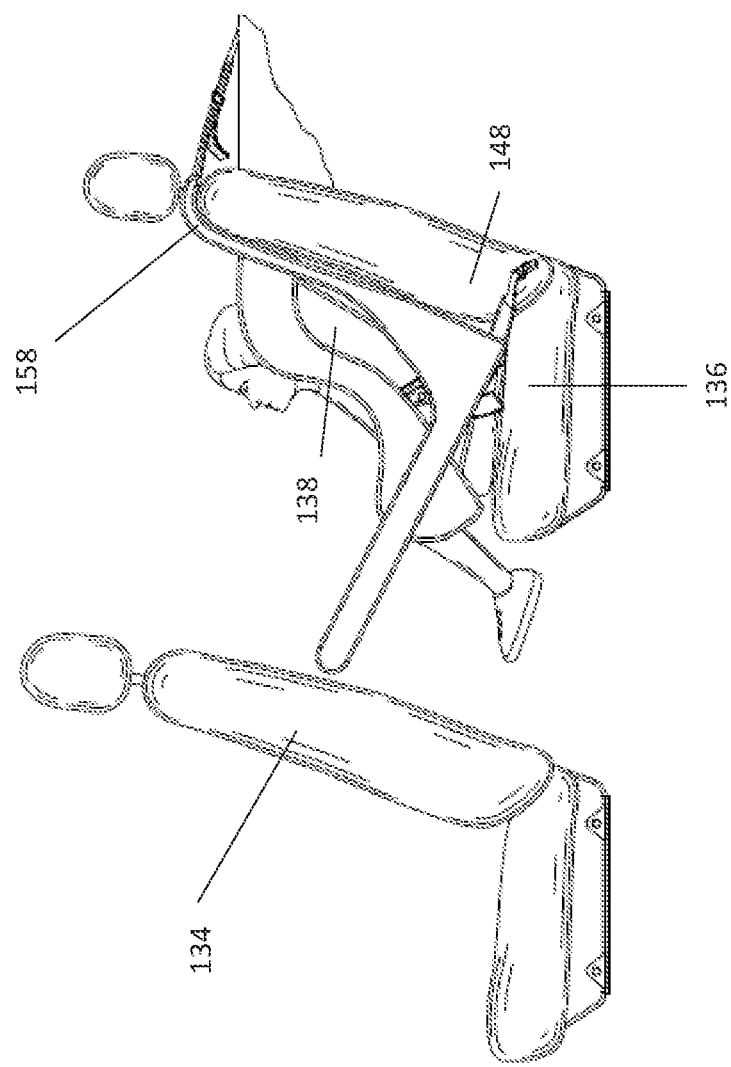
FIG. 8 illustrates a side-view of a wrap-around shield with an extended member in accordance with embodiments of the present disclosure.

Referring to FIG. 8, a side-view of yet even another embodiment is shown. The first end 104 and the second end 112 each include a first elongated member (not shown) and a second elongated member 158 that respectively extend a length of a rear seatback 148 and fold over a top of a rear seatback 148. The first elongated member and the second elongated member 158 are connected to the first end 104 and the second end 112. The first elongated member and the second elongated member 158 have distal ends that are curved away from the frame 102. The folded portions of the first elongated member and a second elongated member 158 are connected to form a lip. The lip can rest on the top of a rear seatback, while a balance of the first elongated member and the second elongated member 158 can rest against the rear seatback 148. In some embodiments, the lip includes a third connecting member (not shown) for connecting to an upper anchor of the rear seat 136. In other embodiments, the first elongated member and the second elongated member 158 include first and second openings (not shown) for permitting the prongs of a rear seat head restraint to be inserted into the rear seatback 148. In yet even other embodiments, the lip is configured to wrap around the back of the prongs of a rear head restraint.

For example, the embodiments and figures show a forward-facing child seat and child in the child seat. The wrap-around shield works equally around a rear-facing child seat and infant in the seat, a child in a booster seat and a child using the lap-shoulder belt system in the rear seat. The embodiments of a wrap-around shield work for children in the right-front passenger seat where risks of injury from an inflating airbag have caused parents to seat children in the 2nd and 3rd rows. The wrap-around shield protects child in child seats or the passenger seat and block the forces of the inflating airbag. In addition, the wrap-around shield can be used in older vehicles not equipped with LATCH anchors by connection to the rear seatbelt anchors or other fixing to the vehicle structures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:
1. A wrap-around shield, comprising:
    a frame having an arc-shaped structure configured to create a space between the wrap-around shield and a child safety seat arranged radially inward from the frame, the child safety seat arranged at least partially between the frame and a first side of a first vehicle seat;
    a first end of the frame configured to curve toward a second end of the frame, the second end of the frame configured to curve toward the first end of the frame, and the first end and the second end having a respective profile that has a height which increases as the first end and the second end curve toward each other;
    a first connecting member connected to the first end of the frame, the first connecting member comprising a tether for connecting to a first latch of the first vehicle seat; and
    an extension connected to the frame and configured to:
    engage a seatback of a second vehicle seat by a pair of clamping members that engage opposite lateral sides of the seatback of the second vehicle seat, or
    engage headrest prongs of the second vehicle seat, or
    engage headrest prongs of the first vehicle seat.
2. The wrap-around shield of claim 1, wherein the frame comprises:
    a first side member connected the first end;
    a front member connected to the first side member; and
    a second side member connected to the front member, the second end being connected to the second side member.

3. The wrap-around shield of claim 2, further comprising a second connecting member connected to the second end, the second connecting member connectable to a second latch of the first seat.

4. The wrap-around shield of claim 1, wherein the first end is connected to the first side member at a non-linear angle.

5. The wrap-around shield of claim 1, wherein the first end is connected to the second end, such that the wrap-around shield forms a closed loop.

6. The wrap-around shield of claim 1, wherein the wrap-around shield is hollow.

7. The wrap-around shield of claim 1, wherein the wrap-around shield has an inner physical structure.

8. The wrap-around shield of claim 1 wherein the extension further comprises a lip, wherein the lip includes a first opening spaced apart from a second opening.

9. The wrap-around shield of claim 1 wherein the extension comprises the pair of clamping members, further comprising:
    a first jaw member;
    a second jaw member,
    wherein the first jaw member and the second jaw member are arranged to form a clamp.

10. The wrap-around shield of claim 1 wherein the extension further comprises:
    a first extended member connected to the first end and configured to have a first extension end that curves away from a balance of the frame; and
    a second extended member connected to the second end of the frame and configured to have a second extension end that curves away from the balance of the frame, the first extension end being connected to the second extension end to form a lip.

11. The wrap-around shield of claim 5 wherein the extension further comprises a single extended member connected to the first end and the second end, the single extended member being configured to have an extension end that curves away from the balance of the frame.

12. The wrap-around shield of claim 10, wherein the lip is connected to a third connecting member configured to engage the headrest prongs.

13. The wrap-around shield of claim 10, wherein the lip comprises a first opening spaced apart from a second opening.

* * * * *